Figure 1:
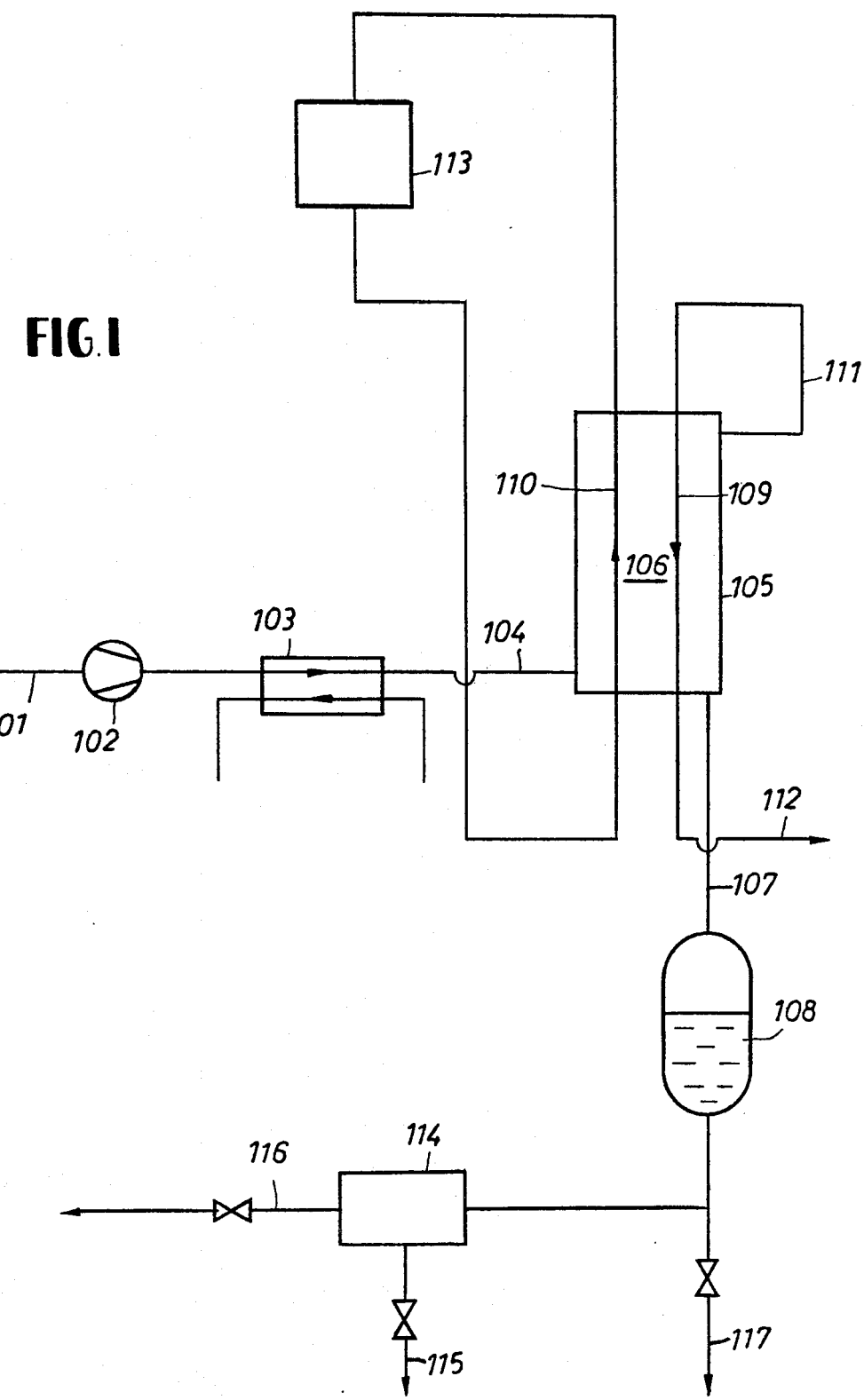

United States Patent [19]

Daeschler et al.

[11] 4,110,091
[45] Aug. 29, 1978

[54] PROCESS FOR THE SEPARATION OF A GASEOUS MIXTURE CONSISTING OF WATER VAPOR, HYDROCARBONS, AND AIR

[75] Inventors: Werner Daeschler; Hans Rainer, both of Munich, Germany

[73] Assignee: Linde Aktiengesellschaft, Wiesbaden, Germany

[21] Appl. No.: 667,998

[22] Filed: Mar. 18, 1976

Related U.S. Application Data

[62] Division of Ser. No. 490,876, Jul. 22, 1974, Pat. No. 3,967,938.

[30] Foreign Application Priority Data

Jul. 20, 1973 [DE] Fed. Rep. of Germany ....... 2337055
Oct. 5, 1973 [DE] Fed. Rep. of Germany ....... 2350115
Oct. 5, 1973 [DE] Fed. Rep. of Germany ....... 2350114
Dec. 20, 1973 [DE] Fed. Rep. of Germany ....... 2363504

[51] Int. Cl.² ................................................. F17C 7/02
[52] U.S. Cl. ........................................... 62/54; 55/82; 55/269; 62/268; 220/85 VR
[58] Field of Search ....................... 55/30, 80, 82, 269; 62/54, 282; 220/85 VR, 85 VS

[56] References Cited

U.S. PATENT DOCUMENTS 3,115,017  12/1963  Kocher et al. .................... 62/282 X
3,791,422   2/1974  Johnson et al. ........................ 62/54

Primary Examiner—Ronald C. Capossela
Attorney, Agent, or Firm—Millen & White

[57] ABSTRACT

In the dispensing of gasoline into a tank used for the storage or transportation of gasoline wherein the gasoline displaces a gaseous mixture of air and gasoline, and said mixture is treated to a recovery step to separate said gasoline from said mixture, there is provided an improvement in the recovery step which comprises cooling said mixture to condense out the gasoline and water from the air thereby purifying the air, and then separating the water from the gasoline.

6 Claims, 1 Drawing Figure

PROCESS FOR THE SEPARATION OF A GASEOUS MIXTURE CONSISTING OF WATER VAPOR, HYDROCARBONS, AND AIR

This is a division of application Ser. No. 490,876, filed July 22, 1974 now U.S. Pat. No. 3,967,938.

BACKGROUND OF THE INVENTION

This invention relates to a process for the separation of the components having a higher boiling point than air from a gaseous mixture consisting of air, hydrocarbons, and water vapor.

When replenishing partially or already completely emptied gasoline tanks, for example, large underground storage tanks for gasoline stations and/or for road rail vehicles, but in particular also the storage tanks of the refineries, large amounts of a gasoline-air mixture are produced, the volume of which corresponds essentially to the volume of the replenished gasoline and which, due to atmospheric moisture, also contains water vapor. Heretofore, this gaseous mixture consisting of hydrocarbons, water vapor, and air has been exhausted directly into the atmosphere which, on the one hand, represents a source of constant danger due to the explosiveness of the mixture and, on the other hand, and herein resides the gravest disadvantage, leads to a continuous contamination of the atmosphere around the storage tanks.

An earlier patent has already suggested a process for the recovery of the hydrocarbons contained in a gasoline-air mixture, wherein the hydrocarbons are scrubbed out of the gasoline-air mixture in a special washing column. The disadvantage of this process, which is effective per se, resides in the relatively large expenditure in apparatus to conduct same. Additionally, the process is relatively inflexible with respect to fluctuations in quantity per unit time of the thus-obtained gasoline-air mixture.

The invention is based on the problem of providing a simple process for the recovery of the hydrocarbons contained in a gaseous mixture consisting of water vapor, hydrocarbons, and air, especially the hydrocarbons contained in a gasoline-air mixture.

This problem is solved, in accordance with the invention, by effecting the separation of the hydrocarbons and of the water vapor by condensation and solid precipitation in a cooled heat exchanger and/or by adsorption on a solid adsorbent.

According to the invention, the separation of the hydrocarbons and the water vapor from the gaseous mixture is accomplished in a simple manner by condensing or freezing out these components during the course of the cooling of the gaseous mixture in a heat exchanger. The gaseous mixture flows through the heat exchanger from the bottom toward the top, thus being cooled in heat exchange with a refrigerant evaporating from a separate cross section of the heat exchanger. During the course of the cooling to which the gaseous mixture is subjected while flowing through the heat exchanger, first a portion of the hydrocarbons is condensed, which portion can be directly withdrawn as product. The velocity of the gaseous mixture introduced into the heat exchanger is dimensioned so that the kinetic energy is not sufficient to entrain thus-formed droplets of condensate into colder regions of the heat exchanger. In this way, it is possible to separate already the largest portion of the hydrocarbons contained in the gaseous mixture in a temperature range lying above the melting temperature of the hydrocarbons. Only a relatively minor remainder of the hydrocarbons and a portion of the water vapor are frozen out within the heat exchanger and, after some time, lead to obstruction within the heat exchanger.

If the gaseous mixture to be separated is fed discontinuously, the regeneration of the heat exchanger takes place during time periods where no gaseous mixture is introduced. The heat exchanger, in this case, is dimensioned so that the entire quantity of gaseous mixture charged between two regenerating intervals can be processed.

The process of this invention can be applied with particular advantage to the purification of hydrocarbon-air mixtures obtained, for example, in refineries during the charging of hydrocarbons into available transport vehicles. Since, normally, the hydrocarbons are only loaded during the day, the heat exchangers are dimensioned so that the entire quantity of gaseous mixture produced during the course of a day can be purified in one continuous operation. The regeneration of the heat exchangers, i.e., the thawing of the solid deposits, then takes place during the night by the introduction, by means of blowers, of ambient air, brought to a slight superatmospheric pressure and thus warmed, into the heat exchangers.

Advantageously, the warming of the air is accomplished in the blower which, during the day, conveys the gaseous mixture to be purified into the plant.

In case the gaseous mixture to be treated is obtained continuously, the gaseous mixture is advantageously processed in two alternating heat exchangers wherein, once one of them is loaded, the operation is switched over to the other one.

In this instance, it is especially advantageous to employ the gasoline-air mixture to be treated for the direct regeneration of a loaded heat exchanger. For this purpose, warm gasoline-air mixture is first fed to the loaded heat exchanger flowing through the latter from the top toward the bottom, thereby melting off the congealed hydrocarbons. Thereupon, the gaseous mixture and the melted hydrocarbons are subjected to a phase separation in a separator. The gaseous mixture obtained during the phase separation is now fed to the second heat exchanger and cooled therein. The hydrocarbons which condense during the cooling step are likewise recycled into the separator, while the frozen-out hydrocarbons are precipitated on the heat-exchange surfaces of the heat exchanger and eventually lead to clogging of the latter.

The condensate obtained in the separator can be withdrawn as product from the plant. However, it is advantageous to subject this condensate to a supplemental water-separating step, since it is unavoidable, owing to the moisture in the air, that water also condenses and/or freezes out in the heat exchangers in addition to the hydrocarbons.

The refrigeration required for the process is made available by a vaporizing refrigerant which is advantageously conducted in a closed cycle.

In order to make available to the plant the cold of the residual gas which is obtained after the condensation and/or freezing out of the hydrocarbons and optionally of the water, this residual gas is expanded according to a further feature of this invention, before being withdrawn from the plant, and warmed in a further cross section of the heat exchanger in heat exchange with the waste gas to be cooled.

The process of this invention can be utilized with the same advantages also in connection with special heat exchangers, such as alternating regenerators or so-called "reversing exchangers."

The process of this invention, as well as the corresponding devices to conduct same are distinguished by simplicity as well as great flexibility with respect to chronological quantity fluctuations of the gaseous mixture to be processed.

Accordingly, the apparatus of this invention is particularly advantageously suitable for installation on vehicles for the transport of gasoline. The apparatus can, for example, be fixedly mounted to a tanker truck and can thus be utilized economically during the filling of the gasoline truck, to process the gasoline-air mixture obtained from the tank of the gasoline vehicle, and can also be utilized when filling the gasoline from the gasoline truck into a fixed storage tank, e.g. in a gasoline station, to process the gasoline-air mixture now obtained from the storage tank of the gasoline station.

Besides the already described methods for the regeneration of a loaded heat exchanger, a further, particularly effective method resides in that a hot stream of steam is introduced for a brief period of time into the heat exchanger cross section wherein normally the residual gas fraction freed of hydrocarbons and water vapor is rewarmed.

It has been found that the short-term introduction of a hot stream of steam, a so-called steam jet, into the cross section for the residual gas fraction causes especially the ice on the outer surface of the cross section so break up immediately into small pieces and to drop away from the surface, the latter remaining completely dry. Due to the large heat transfer coefficient of the steam condensing on the inner surface of the cross section, the cross section is very rapidly warmed up from the inside; this is so, because due to the poor thermal conductivity of the ice adhering to the outer surface, almost no warmth penetrates into the ice proper. The rapid heating of the metallic cross section is connected, due to the cubic thermal expansion coefficient, with a quick and relatively strong expansion, leading to fragmentation of the brittle ice layer. Since the bonding forces between the ice layer and the outer surface of the cross section are small, the ice breaks away from the outer surface without leaving any traces.

In many cases, it is not at all necessary to raise the mean cross section temperature during regeneration above the melting point of the ice. This holds true, in particular, if the production process takes place previously at very low temperatures (about −60° C. to −80° C.) and thus there is a sufficient temperature interval between the normal production temperature and the melting point of the ice, within which the relative temperature elevation of the cross section can adjust itself. Since, on the one hand, the ice need not at all be melted and, on the other hand, no large secondary masses need to be warmed due to the astonishingly short time of the regenerating process, the total heat requirement is relatively minor. The regenerating times are reduced to a few minutes.

According to a further feature of the invention, a large part of the cold can be recovered if the ice pieces obtained during the regeneration are collected in the lower portion of the heat exchanger, e.g. of a reflux condenser, and the gaseous stream to be purified is conducted through and/or over the ice pieces. In this heat exchange, the ice chunks are melted and give off the largest portion of their cold to the introduced gaseous mixture, whereby the latter is already precooled.

With the usually ambient conditions, the gaseous mixture has a temperature of about 30° C. and a relative humidity of about 50–60%. However, this means that the partial pressure of the water vapor in the gaseous mixture is substantially higher than the water vapor pressure of the ice of at most 0° C. at the bottom of the reflux condenser. From the ambient partial pressure difference, a considerable portion of the water vapor entrained with the arriving gaseous mixture is already condensed and separated in the ice charge. Thus, the additional advantage is attained that initially less water can settle in the form of ice within the heat exchanger.

It was found that the thus-produced ice pieces can fall downwardly unhindered within the reflux condenser, if the minimum spacing between the cross section for the residual gas fraction and a cross section for a refrigerant is at least as large as approximately 1.5–2 times the diameter of the cross section for the residual gas fraction.

The condensed water remaining in the cross section after the steam jet has been applied is forced out, while the tube wall is still warm, after reversing by the exhaust gas and/or the product gas. Any remaining residual moisture is likewise removed by the product gas, since the latter, after flowing through the cold outer space of the reflux condenser, is in any event sufficiently dry. Even ice particles which may be formed in the interior of the pipe coil are in this way removed in the course of time.

Since the regenerating period is only a few minutes long, it is advantageous not to inactivate the refrigerating unit during this time, i.e., the cooling of the reflux condenser is continued. The cold losses incurred because the purified gas obtained at the head of the reflux condenser is now introduced into the atmosphere in the cold condition are negligible due to the shortness of the regenerating period.

According to a further feature of the invention, the obtained gaseous mixture is separated by means of a solid adsorbent which adsorbs the hydrocarbons and the water vapor and allows the air to pass through unhindered. The adsorbent is regenerated by means of water vapor, wherein the exhaust gas obtained during the regeneration and consisting of hydrocarbons and water vapor is preliminarily separated to segregate at least the largest portion of the water vapor, and the residual gas obtained during the preliminary separation, consisting essentially of hydrocarbons, is compressed and thereafter cooled.

Due to the fact that the exhaust gas obtained during the regeneration of the adsorber is subjected to a preliminary separation wherein already the largest portion of the water vapor is separated, the amount of the residual gas enriched with hydrocarbons is relatively small, so that relatively small compressors can be utilized for the compression step. After the compression, the residual gas is cooled, for example by means of a water cooler, so that the hydrocarbons are condensed and are available as a liquid final product.

It proved to be especially advantageous to effect the preliminary separation of the waste gas, obtained during the regeneration of the adsorber and consisting of hydrocarbons and water vapor, by means of water cooling. During this procedure, the water vapor is almost completely condensed, so that the residual gas produced during the preliminary separation consists almost exclusively only of hydrocarbons.

If several hydrocarbons with various boiling points are contained in the gaseous mixture to be treated, it is advantageous to provide a multistage compression of the residue gas and to condense, after each compression stage, respectively a portion of the hydrocarbons, for example by air or water cooling.

The invention satisfies two important requirements. On the one hand, it is possible thereby to obtain air of almost any desired purity from a gaseous mixture consisting of hydrocarbons, thus making a considerable contribution toward the avoidance of atmosphere contaminations, and, on the other hand, it is thus made possible to recover the hydrocarbons, in a simple and energy-saving process, in an almost pure condition in the liquid phase, so that these hydrocarbons can be passed on directly to further use, for example as high-quality energy carriers.

Additional explanations of the invention can be derived from the embodiment thereof, schematically illustrated in the figure.

In the drawings:

FIG. 1 shows an embodiment for discontinuous operation.

According to FIG. 1, the gasoline-air mixture produced during the day when filling gasoline storage tanks of a refinery, which mixture due to atmospheric humidity is also enriched with water vapor, is fed to the plant via conduit 101, compressed in the blower 102 to about 1.5 atmospheres absolute, and subsequently cooled in the cooler 103 to about 40° C. By way of conduit 104, the gaseous mixture enters the single heat exchanger 105; in the outer chamber 106 of the latter, the mixture is cooled to about −55° C. During the course of this cooling step, a portion of the water vapor and the hydrocarbons are condensed and flow into the collecting vessel 108 via conduit 107. The remainder of the water vapor is deposited in the form of ice on the outer surfaces of the heat exchanger cross sections 109 and 110.

The cold, extensively purified air obtained in the upper, i.e., coldest, zone of the heat exchanger 105 is withdrawn via conduit 111, warmed to about 10° C. in the cross section 109 of heat exchanger 105 in indirect heat exchange with entering gaseous mixture, and is finally withdrawn from the plant via conduit 112. The cold required for the cooling step and the partial condensation of the gaseous mixture is made available by a suitable refrigerant conducted in a closed cycle, such as "Freon," which is liquefied in the cooling station 113 and vaporized in the cross section 110 of heat exchanger 105.

The liquid mixture of hydrocarbons and water obtained in the collecting vessel 108 flows into the water-separator 114, from which the water is discharged via conduit 115 and the hydrocarbons, i.e., the gasoline, are withdrawn by way of conduit 116.

The heat exchanger 105 is dimensioned so that the entire amount of gaseous mixture obtained during one day in the refinery during the loading of gasoline can be processed. The heat exchanger 105 is regenerated, i.e., the ice formed in the heat exchanger 105 is thawed off, during the night, i.e., in an interval where no gaseous mixture is produced in the refinery. For this purpose, the cold-producing unit 113 and the air cooler 103 are inactivated. Thereupon, air is conveyed via conduit 101 and the blower 102 into the heat exchanger 105. During passage through the blower, the air is warmed. Within the heat exchanger 105, the warm air thaws the ice. The thus-produced water flows via conduit 107 into the collecting vessel 108 from which it is finally discharged to the outside by way of conduit 117.

The blower 102, the heat exchangers 103 and 105, as well as the pipelines connecting these components with one another are designed for the ignition pressure of the produced gasoline-air mixture, so that a preceding saturation of the gasoline-air mixture with hydrocarbons is unnecessary.

The heat exchanger can also be regenerated with another warm gas or even with a warm liquid, such as, for example, the liquid, not yet expanded refrigerant. Such a gas or such a liquid can also be utilized additionally to the air for regenerating purposes, in order to accelerate the regeneration process.

What is claimed is:

1. A process for the separation of components having a higher boiling point than air from a gaseous mixture consisting essentially of air, hydrocarbons and water vapor, comprising the steps of:
    (a) passing said gaseous mixture to a heat exchanger provided with cooling tubes containing refrigerant cooled by a closed refrigeration cycle, said cooling of said gaseous mixture being conducted in a first stage within said heat exchanger to form a liquid condensate of water and hydrocarbons, and in a second stage within said heat exchanger to freeze out residual hydrocarbons and water to form solid deposits on the cooling tube surfaces;
    (b) withdrawing cold, extensively purified air from the heat exchanger proximate the coldest zone thereof;
    (c) recycling said cold, extensively purified air to said heat exchanger in a separate tube provided therein to cool, by indirect heat exchange, the entering gaseous mixture and warm said cold, extensively purified air;
    (d) recovering the condensate water and hydrocarbons, and separating water therefrom to recover said hydrocarbons.

2. A process according to claim 1, wherein the cold extensively purified air if withdrawn in step (b) at a temperature of about −55° C., and is then warmed in said separate tube in the heat exchanger to 10° C.

3. A process according to claim 1, wherein said gaseous mixture is compressed in a blower prior to step (a), and said heat exchanger is regenerated during time periods wherein no gaseous mixture is being fed to said heat exchanger, said heat exchanger being regenerated by compressing warm air in said blower to a slight superatmospheric pressure and passing said warm air through said heat exchanger.

4. A process according to claim 1, characterized in that said heat exchanger is regenerated during time periods wherein no gaseous mixture is being fed to the heat exchanger.

5. A process according to claim 1 characterized in that the loading of the heat exchanger takes place during the day and the regulation during the night.

6. A process according to claim 1 characterized in that the heat exchanger is regenerated by blowing thereinto warm air brought to a slight superatmospheric pressure.

* * * * *